A. DUNN.
Galvanic Register for Boilers.
No. 7,394.
Patented May 28, 1850.
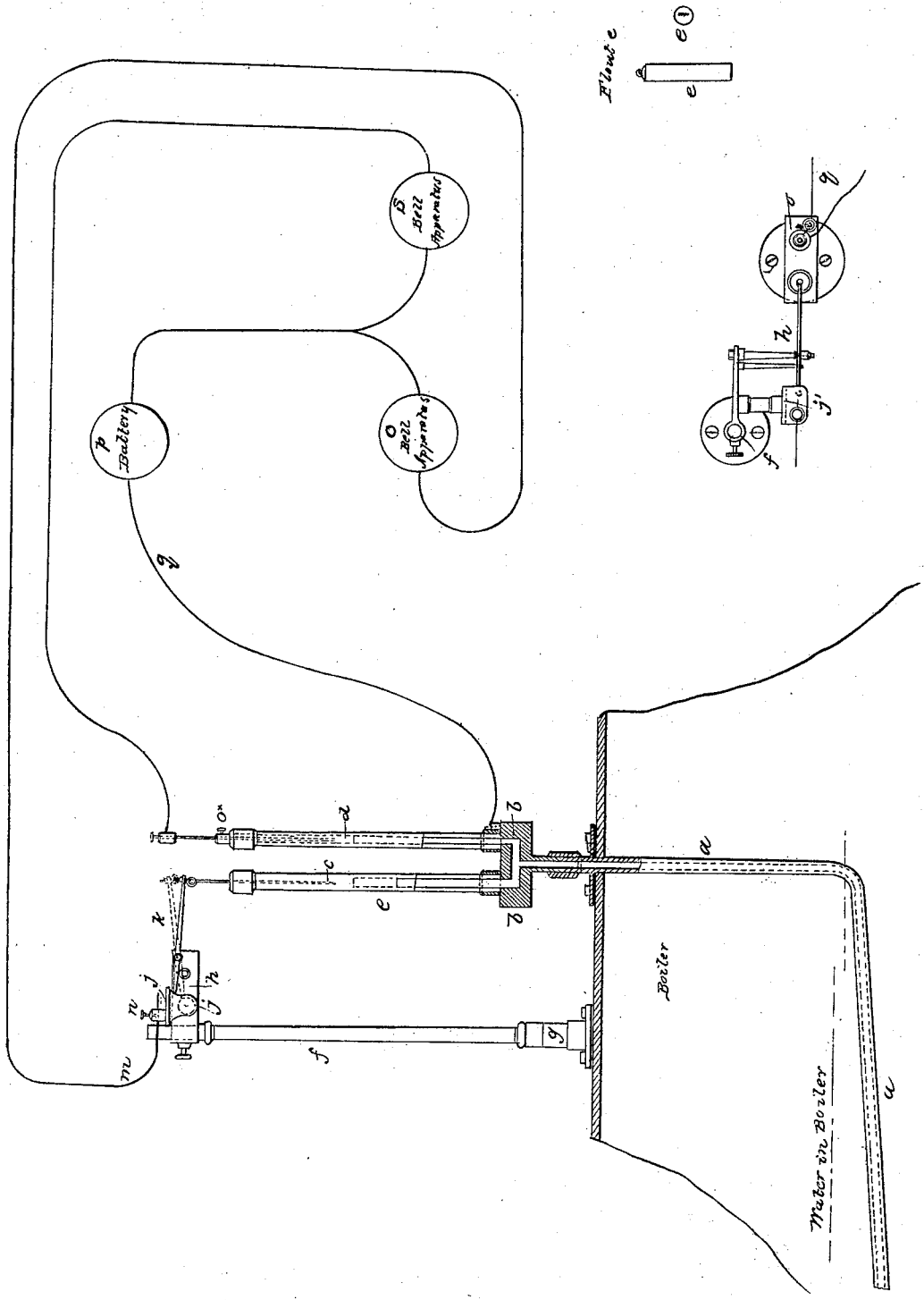

UNITED STATES PATENT OFFICE.

ARTHUR DUNN, OF DALSTON, COUNTY OF MIDDLESEX, ENGLAND.

IMPROVEMENT IN GALVANIC REGISTERS FOR STEAM-BOILERS.

Specification forming part of Letters Patent No. 7,394, dated May 28, 1850.

*To all whom it may concern:*

Be it known that I, ARTHUR DUNN, of Dalston, in the county of Middlesex, chemist, a subject of the Queen of Great Britain, have invented or discovered new and useful Improvements in Ascertaining and Indicating the Temperature and Pressure of Fluids; and I, the said ARTHUR DUNN, do hereby declare that the following is a specification.

My invention consists of so combining and applying thermometric apparatus and electric currents as to ascertain the temperature and pressure of fluids in vessels, principally applicable to steam and other boilers.

My invention also consists of combining electric apparatus with pressure-gages in such manner as to ascertain and indicate when the pressure of a fluid arrives at a determined point.

In order that my invention may be most fully and readily understood, I will proceed to describe the means pursued by me.

The drawing represents so much of a section of part of a steam-boiler having apparatus applied thereto, according to my invention, as will enable me to describe my improvements.

$a$ is a tube descending into the boiler so as to come just below the water-line, and it is bent in such manner as to come in contact with the sides of the boiler. The tube $a$ is securely fixed to the boiler, as shown, and it has the branch $b$ fixed at its upper end, into which two tubes, $c$ $d$, (which I prefer to be of glass,) are fixed. The tubes $a$ $c$ $d$ and the branch $b$ are filled with mercury, as is indicated by the pink color, and there is an iron float, $e$, in the tube $c$, with a piece of platina at its upper end.

$f$ is a standard fixed to the upper part of the boiler, but insulated therefrom by the glass at $g$. At the upper part of the standard is the sliding piece $h$, which may be slid up or down, and fixed by a screw, $i$, to the sliding piece $h$ is affixed the branch $j$, the stem of which being partly of glass, the plate $j'$ will be insulated.

$k$ is a lever, which at one end is attached to a wire, $l$, which descends through a guide-hole in the cap into the tube $c$, there being at the lower end of such wire a point of platina, so that when the float rises there will be an electric circuit formed, as hereinafter explained. At the other end of the lever $k$ is fixed a piece of platina, and there is also a piece of platina on the under surface of the plate $j'$, so that when the end of the lever rests under the plate $j'$ there will be a continued line of metal contact between these parts; but a complete electric circuit will not be produced till the float in the tube $c$ rises and comes in contact with the wire thereon.

It should be understood that the weight of the end of the lever connected to the wire is to be such as to raise the other end of the lever, so that it may rest under the plate $j'$, as shown.

$m$ is a wire fixed by a screw, $n$, to the plate $j'$. This wire leads to a bell apparatus at $o$, such as is used in electric telegraphs, as are well understood, the object being to give notice of the rising of the steam after it has been down, and in order to complete the circuit the wire passes from the bell apparatus to the battery at $p$, there being a wire, $q$, from the other pole of the battery to the branch $b$. By this arrangement so soon as the float rises in contact with the wire a circuit will be completed and the bell at $o$ will ring; but the continued rising of the float will raise the lever at one end and depress it at the other, so as to put it out of contact with the plate $j'$, and then so long as the steam continues to be at the working-pressure the bell at $o$ will not again be called into action, the use of the bell at $o$ being intended only to indicate that the apparatus is in working order at the time of raising the steam.

In adjusting the position of the lower end of the wire in the tube $c$ it is to be so placed as to be acted on by the float, so as to break the circuit before the working-pressure of the steam has been attained. This part of the apparatus is not essential, but I prefer to employ the same in addition to what I will now proceed to explain.

In the tube $d$ is a wire, which is to be set in such manner that its lower end, which should be of platina, will come just above the quicksilver in the tube when it stands therein at the height which it will be caused to take by the heat, which should produce the pressure of steam desired in the boiler, and therefore, at starting, the apparatus is to be adjusted when the steam is at its working-pressure in the boiler, and when the wire in tube $d$ has been adjusted it is to be fixed by the set-screw $o$, as shown. From the upper end of the wire in the tube $d$ proceeds the wire $r$ to the bell apparatus at $s$, and thence to the battery. By this arrangement when the heat in the boiler rises above that which is proper for producing the desired pressure of steam in the boiler an electric circuit will be completed and the bell at $s$ will continue to ring, and thus persons near or at a distance will be informed that the temperature or pressure in the boiler is greater than that which has been determined shall be the temperature or working-pressure in the particular boiler, the thermometric apparatus ascertaining the temperature, and the electric apparatus indicating, either near or at a distance, when the temperature and pressure rise too high.

I have spoken of a bell apparatus being used at only one place for each part of the apparatus; but it will be evident that bells or other indicating apparatus may be used at several places, and be simultaneously acted on by an electric current, the battery and connecting-wires being suitably arranged accordingly.

The description of battery I have used is that known as "Smee's;" but this may be varied, and the nature of the battery will, as is well understood, depend on the extent of circuit and bell apparatus used.

If desired, the tube $d$ may have a graduated scale applied to indicate the temperature to the sight, so that the same may be ascertained at any time.

I would remark that, although this apparatus is chiefly intended for steam and other boilers where fluids are being heated under pressure, and liable to produce injurious effects if neglected after the heat and pressure have risen beyond a certain extent, yet such apparatus may be applied to ascertain and indicate, both near and at a distance, when the temperature of a fluid in a vessel has been raised to a determined degree of heat.

When carrying out my invention by using a steam or pressure gage in place of thermometric apparatus I prefer for this purpose to use the ordinary glass steam-gage, and I introduce a platina wire at that height in the gage which would come just above the working-pressure, so that when the pressure of the steam rises above the desired working-pressure the quicksilver will be raised and it will come in contact with the platina wire, which, being made part of an electric circuit, will act as a bell or other indicating apparatus, either near or at a distance.

If desired, several platina wires, insulated from each other, may be introduced at different heights in the steam-gage, and the circuit-wire attached to that one which, for the time being, comes just above the desired working-pressure. The wire or wires are to be introduced in an air and steam tight manner.

Having thus described the nature of my invention and the manner in which the same is to be performed, I would remark that I make no claim to any of the parts separately, nor do I confine myself to the details as herein shown and described, so long as the peculiar character of my invention be retained; but

What I claim is—

A galvanic battery or generator of electricity and its current wires or conductors, an alarm or bell apparatus, and a mercurial-column tube, combined with a steam-boiler and made to operate substantially in manner and for the purpose of indicating the temperature or pressure of steam in the boiler, as specified.

ARTHUR DUNN.

Witnesses:
H. BURGESS,
J. TURPIN,
Of No. 29 *Swithin's Lane, London.*